(12) United States Patent
Maizels et al.

(10) Patent No.: US 11,915,705 B2
(45) Date of Patent: Feb. 27, 2024

(54) FACIAL MOVEMENTS WAKE UP WEARABLE

(71) Applicant: Q (CUE) LTD., Ramat Gan (IL)

(72) Inventors: Aviad Maizels, Ramat Hasharon (IL); Avi Barliya, Tel Aviv (IL); Yonatan Wexler, Jerusalem (IL)

(73) Assignee: Q (Cue) Ltd., Ramat Gan (IL)

( * ) Notice: Subject to any disclaimer, the term of this patent is extended or adjusted under 35 U.S.C. 154(b) by 0 days.

(21) Appl. No.: 18/181,805

(22) Filed: Mar. 10, 2023

(65) Prior Publication Data

US 2023/0230594 A1 Jul. 20, 2023

Related U.S. Application Data

(63) Continuation of application No. PCT/IB2022/056418, filed on Jul. 12, 2022, which is
(Continued)

(51) Int. Cl.
*G10L 15/26* (2006.01)
*G06F 40/58* (2020.01)
(Continued)

(52) U.S. Cl.
CPC .......... *G10L 15/26* (2013.01); *G02B 27/0093* (2013.01); *G06F 40/58* (2020.01);
(Continued)

(58) Field of Classification Search
CPC ......... G10L 15/25; G10L 15/16; G10L 13/04; G10L 13/02; G10L 13/027; G10L 15/24;
(Continued)

(56) References Cited

U.S. PATENT DOCUMENTS

| 5,826,234 A | 10/1998 | Lyberg |
| 7,859,654 B2 | 12/2010 | Hartog |

(Continued)

FOREIGN PATENT DOCUMENTS

| CN | 105488524 A | * | 4/2016 | ............ G06F 18/22 |
| WO | WO-02077972 A1 | * | 10/2002 | ............ G10L 15/24 |
| WO | WO-2021040747 A1 | * | 3/2021 | ............ G01S 13/50 |

OTHER PUBLICATIONS

Chandrashekhar, V., "The Classification of EMG Signals Using Machine Learning for the Construction of a Silent Speech Interface," *The Young Researcher—RSGC Royal St. George's College*, 2021, vol. 5, Issue 1, pp. 266-283.
(Continued)

*Primary Examiner* — Angela A Armstrong
(74) *Attorney, Agent, or Firm* — Finnegan, Henderson, Farabow, Garrett & Dunner LLP (57) ABSTRACT

Wearable coherent light sensing systems and methods are disclosed. In one implementation, a system may include a wearable coherent light source configured to direct light towards a facial area; a wearable sensor configured to receive light source reflections and to output associated reflection signals; and a processor operable in an idle mode and in a high power mode. In the idle mode, the processor is configured to receive the reflection signals, process the reflection signals to identify trigger in the reflection signals, and automatically switch to the high power mode upon identification of the trigger. In the high power mode, the processor is configured to analyze the reflection signals to identify facial movements associated with silent speech. Following the identification of the facial movements associated with the silent speech, the processor is configured to decipher the facial movements and generate an output associated with the silent speech.

21 Claims, 7 Drawing Sheets

Related U.S. Application Data a continuation-in-part of application No. PCT/US2022/054527, filed on May 16, 2022.

(60) Provisional application No. 63/229,091, filed on Aug. 4, 2021.

(51) Int. Cl.
| | |
|---|---|
| *G06V 10/60* | (2022.01) |
| *G06V 40/16* | (2022.01) |
| *G06V 10/141* | (2022.01) |
| *G10L 15/16* | (2006.01) |
| *G06V 10/82* | (2022.01) |
| *G10L 13/027* | (2013.01) |
| *G10L 13/04* | (2013.01) |
| *G10L 15/25* | (2013.01) |
| *G02B 27/00* | (2006.01) |
| *G10L 13/02* | (2013.01) |
| *G06F 3/01* | (2006.01) |

(52) U.S. Cl.
CPC ............ *G06V 10/141* (2022.01); *G06V 10/60* (2022.01); *G06V 10/82* (2022.01); *G06V 40/171* (2022.01); *G06V 40/174* (2022.01); *G06V 40/176* (2022.01); *G10L 13/02* (2013.01); *G10L 13/027* (2013.01); *G10L 13/04* (2013.01); *G10L 15/16* (2013.01); *G10L 15/25* (2013.01); *G06F 3/015* (2013.01)

(58) Field of Classification Search
CPC ..... G10L 15/26; G02B 27/0093; G06F 40/58; G06V 10/141; G06V 10/145; G06V 10/60; G06V 10/82; G06V 40/16; G06V 40/171; G06V 40/174; G06V 40/176
See application file for complete search history.

(56) References Cited

U.S. PATENT DOCUMENTS

| | | |
|---|---|---|
| 8,638,991 B2 | 1/2014 | Zalevsky et al. |
| 8,792,159 B2 | 7/2014 | Zalevsky et al. |
| 8,860,948 B2 | 10/2014 | Abdulhalim et al. |
| 9,129,595 B2 | 9/2015 | Russell et al. |
| 9,199,081 B2 | 12/2015 | Zalevsky et al. |
| 9,288,045 B2 | 3/2016 | Sadot et al. |
| 9,668,672 B2 | 6/2017 | Zalevsky et al. |
| 10,335,041 B2 | 7/2019 | Fixler et al. |
| 10,679,644 B2 | 6/2020 | Rakshit et al. |
| 10,838,139 B2 | 11/2020 | Zalevsky et al. |
| 11,169,176 B2 | 11/2021 | Zalevsky et al. |
| 11,341,222 B1 | 5/2022 | Caffey |
| 11,343,596 B2 | 5/2022 | Chappell, III et al. |
| 11,605,376 B1 | 3/2023 | Hoover |
| 2004/0249510 A1 | 12/2004 | Hanson |
| 2006/0287608 A1 | 12/2006 | Dellacorna |
| 2008/0103769 A1 | 5/2008 | Schultz et al. |
| 2009/0233072 A1 | 9/2009 | Harvey et al. |
| 2014/0375571 A1 | 12/2014 | Hirata |
| 2015/0253502 A1 | 9/2015 | Fish et al. |
| 2016/0004059 A1 | 1/2016 | Menon et al. |
| 2016/0011063 A1 | 1/2016 | Zhang et al. |
| 2016/0027441 A1 | 1/2016 | Liu et al. |
| 2016/0093284 A1 | 3/2016 | Begum et al. |
| 2016/0116356 A1 | 4/2016 | Goldstein |
| 2016/0379638 A1 | 12/2016 | Basye et al. |
| 2017/0084266 A1 | 3/2017 | Bronakowski et al. |
| 2017/0222729 A1 | 8/2017 | Sadot et al. |
| 2017/0263237 A1 | 9/2017 | Green et al. |
| 2018/0020285 A1 | 1/2018 | Zass |
| 2018/0107275 A1 | 4/2018 | Chen et al. |
| 2018/0232511 A1 | 8/2018 | Bakish |
| 2019/0074012 A1 | 3/2019 | Kapur et al. |
| 2019/0074028 A1 | 3/2019 | Howard |
| 2019/0189145 A1 | 6/2019 | Rakshit et al. |
| 2019/0277694 A1 | 9/2019 | Sadot et al. |
| 2020/0020352 A1 | 1/2020 | Ito et al. |
| 2020/0075007 A1 | 3/2020 | Kawahara et al. |
| 2021/0027154 A1 | 1/2021 | Zalevsky et al. |
| 2021/0035585 A1* | 2/2021 | Gupta ................. G10L 15/26 |
| 2021/0052368 A1 | 2/2021 | Smadja et al. |
| 2021/0063563 A1 | 3/2021 | Zalevsky et al. |
| 2021/0072153 A1 | 3/2021 | Zalevsky et al. |
| 2021/0169333 A1 | 6/2021 | Zalevsky et al. |
| 2022/0084196 A1 | 3/2022 | Ogawa et al. |
| 2022/0125286 A1 | 4/2022 | Zalevsky et al. |
| 2022/0163444 A1 | 5/2022 | Zalevsky |
| 2023/0215437 A1 | 7/2023 | Maizels et al. |
| 2023/0230574 A1 | 7/2023 | Maizels et al. |
| 2023/0230575 A1 | 7/2023 | Maizels et al. |
| 2023/0230594 A1 | 7/2023 | Maizels et al. |
| 2023/0267914 A1 | 8/2023 | Maizels et al. |

OTHER PUBLICATIONS

International Search Report and Written Opinion from International Application No. PCT/IB2022/054527 dated Aug. 30, 2022 (7 pages).
International Search Report and Written Opinion from International Application No. PCT/IB2022/056418 dated Oct. 31, 2022 (11 pages).

* cited by examiner

FACIAL MOVEMENTS WAKE UP WEARABLE

CROSS-REFERENCE TO RELATED APPLICATION

This application is a continuation of International Application No. PCT/IB2022/056418, filed on Jul. 12, 2022, which is a continuation-in-part of International Application No. PCT/IB2022/054527, filed on May 16, 2022, which claims the benefit of U.S. Provisional Application No. 63/229,091, filed on Aug. 4, 2021, all of which are incorporated herein by reference in their entirety

FIELD OF THE INVENTION

The present invention relates generally to physiological sensing, and particularly to algorithms, methods and systems for sensing silent human speech.

BACKGROUND

The process of speech activates nerves and muscles in the chest, neck, and face. Thus, for example, electromyography (EMG) has been used to capture muscle impulses for purposes of silent speech sensing.

SUMMARY

An embodiment of the present invention that is described hereinafter provides method for generating speech includes uploading a reference set of features that were extracted from sensed movements of one or more target regions of skin on faces of one or more reference human subjects in response to words articulated by the subjects and without contacting the one or more target regions. A test set of features is extracted a from the sensed movements of at least one of the target regions of skin on a face of a test subject in response to words articulated silently by the test subject and without contacting the one or more target regions. The extracted test set of features is compared to the reference set of features, and, based on the comparison, a speech output is generated, that includes the articulated words of the test subject.

In some embodiments, extracting the test features includes extracting the test features without vocalization of the words by the test subject.

In some embodiments, the test subject and at least one of the reference subjects are the same.

In an embodiment, extracting the test set of features includes irradiating the one or more target regions of the skin of the test subject with coherent light, and detecting changes in a sensed secondary coherent light pattern due to reflection of the coherent light from the one or more target regions.

In another embodiment, the uploaded reference set of features and the extracted test set of features each includes a respective waveform calculated for a respective location in a set of locations within the one or more target regions of the skin from a respective time sequence of an energy metric of the sensed secondary coherent light pattern that corresponds to the location.

In some embodiments, comparing the extracted features includes training and applying a machine learning (ML) algorithm to generate the speech output.

In some embodiments, generating the speech output includes synthesizing an audio signal corresponding to the speech output.

In some embodiments, using the speech output, background audio signals are cleaned from a voiced audio signal.

In an embodiment, generating the speech output includes generating text.

In another embodiments, generating the speech output includes, upon failing to distinguish in a given time interval between multiple candidate words with at least a predefined confidence level, generating the speech output for the given time interval by mixing audio of two or more of the candidate words.

In some embodiments, comparing the extracted test set of features to the reference set of features is performed using a trained artificial neural network (ANN), wherein the ANN was trained on a data set collected from a cohort of reference human subjects.

In some embodiments, the method further includes retraining the ANN using data set collected from test subjects.

In some embodiments, the method further includes, using the sensed movements of at least one of the target regions of skin on a face of a test subject, indicating an intent of speech by the test subject.

In an embodiment, the sensed movements are acquired using acquisition rate lower than 200 samples (e.g., frames) per second. In another embodiment, the sensed movements are acquired using acquisition rate between 60 and 140 samples per second.

In general, acquisition sample rate is lower than 200 samples per second, whatever type of signal is being sampled (e.g., coherent light, microwaves, ultrasound waves, etc.).

There is additionally provided, in accordance with another embodiment of the present invention, a method for synthesizing speech, the method including receiving input signals from a human subject that are indicative of intended speech by the human subject. The signals are analyzed to extract words corresponding to the intended speech, such that in at least some time intervals of the intended speech, multiple candidate phonemes are extracted together with respective probabilities that each of the candidate phoneme corresponds to the intended speech in a given time interval. Audible speech is synthesized responsively to the extracted phonemes, such that in the at least some of the time intervals, the audible speech is synthesized by mixing the multiple candidate phonemes responsively to the respective probabilities.

In some embodiments, the input signals include sensed movements of one or more target regions of skin on faces of the human subjects in response to phonemes articulated by the subject and without contacting the one or more target regions.

In some embodiments, the input signals include at least one of signals received by irradiating the one or more target regions of the skin of the test subject with coherent light, with changes being detected in a sensed secondary coherent light pattern due to reflection of the coherent light from the one or more target regions, one or more of optical lip-readings signals, EMG signals, EEG signals, and noisy audio signals.

There is further provided, in accordance with another embodiment of the present invention, a system for generating speech, the system including a memory and a processor. The memory is configured to store a reference set of features that were extracted from sensed movements of one or more target regions of skin on faces of one or more reference human subjects in response to words articulated by the subjects and without contacting the one or more target regions. The processor is configured to (i) upload from the memory the reference set of features, (ii) extract a test set of features from the sensed movements of at least one of the target regions of skin on a face of a test subject in response to words articulated silently by the test subject and without contacting the one or more target regions, and (iii) compare the extracted test set of features to the reference set of features, and, based on the comparison, generate a speech output including the articulated words of the test subject.

In some embodiments, the sensed movements are acquired by optical sensing head and processing circuitry that are fitted inside a stem of wireless headphones.

There is furthermore provided, in accordance with yet another embodiment of the present invention, a system for synthesizing speech, the system including a sensor and a processor. The sensor is configured to receive input signals from a human subject that are indicative of intended speech by the human subject. The processor is configured to (a) analyze the signals to extract words corresponding to the intended speech, such that in at least some time intervals of the intended speech, multiple candidate phonemes are extracted by the processor together with respective probabilities that each of the candidate phoneme corresponds to the intended speech in a given time interval, and (b) synthesize audible speech responsively to the extracted phonemes, such that in the at least some of the time intervals, the audible speech is synthesized by the processor by mixing the multiple candidate phonemes responsively to the respective probabilities.

The present invention will be more fully understood from the following detailed description of the embodiments thereof, taken together with the drawings in which:

DETAILED DESCRIPTION OF EMBODIMENTS

The widespread use of mobile telephones in public spaces creates audio quality issues. For example, when one of the parties in a telephone conversation is in a noisy location, the other party or parties may have difficulty in understanding what they are hearing due to background noise. Moreover, use in public spaces often raises privacy concerns, since conversations are easily overheard by passersby.

The human brain and neural activity are complex phenomena that involves many human subsystems. One of those subsystems is the facial region which humans use to communicate with others. It is an innate activity that conveys several levels of meaning. At the core, humans communicate with language. The formation of concepts is closely related to the formation of words and then their language-dependent sounds. Humans train to articulate sounds from birth. Even before full language ability evolves, babies use facial expressions, including micro-expressions, to convey deeper information about themselves. The combined interaction with a person provides another value which is trust. While trust in someone begins with their appearance so that we know who we are talking with, their reactions can provide further trust that the person is no incapacitated.

In the normal process of vocalization, motor neurons activate muscle groups in the face, larynx, and mouth in preparation for propulsion of air flow out of the lungs, and these muscles continue moving during speech to create words and sentences. Without this air flow, no sounds are emitted from the mouth. Silent speech occurs when the air flow from the lungs is absent, while the muscles in the face, larynx, and mouth continue to articulate the desired sounds. Silent speech can thus be intentional, for example when one articulates words but does not wish to be heard by others. This articulation can occur even when one conceptualizes spoken words without opening our mouths. The resulting activation of our facial muscles gives rise to minute movements of the skin surface. The present disclosure builds on a system for sensing neural activity, the detection focused on the facial region, which allows the readout of residual of muscular activation of the facial region. These muscles are involved in the inter-human communication such as production of sounds, facial expressions, (including micro-expressions), breathing and other signs humans use for inter-person communication.

Embodiments of the present invention that are described herein enable users to articulate words and sentences without actually vocalizing the words or uttering any sounds at all. The inventors have found that by properly sensing and decoding these movements, it is possible to reconstruct reliably the actual sequence of words articulated by the user.

In some embodiments, a system comprising a wearable device and dedicated software tools deciphers data sensed from fine movements of the skin and subcutaneous nerves and muscles on a subject's face, occurring in response to words articulated by the subject with or without vocalization, and use the deciphered words in generating a speech output including the articulated words. Details of devices and methods used in sensing the data from fine movements of the skin, are described in the above-mentioned International Patent Application PCT/IB2022/054527.

The disclosed deciphering techniques enable users to communicate with others or to record their own thoughts silently, in a manner that is substantially imperceptible to other parties and is also insensitive to ambient noise.

Some embodiments use sensing devices having the aforementioned form of common consumer wearable items, such as a clip-on headphone or spectacles. In these embodiments, an optical sensing head is held in a location in proximity to the user's face by a bracket that fits in or over the user's ear.

The optical sensing head senses coherent light reflected from the face, for example by directing coherent light toward an area of the face, such as the cheek, and sensing changes in the coherent light pattern that arises due to reflection of the coherent light from the face. Processing circuitry in the device processes the signal output by the optical sensing head due to the reflected light to generate a corresponding speech output. In one embodiment, the optical sensing head and processing circuitry is fitted inside a stem of wireless headphones, such as AirPods. In that embodiment, sensing is slightly further away from the sensed skin location and the sensor's viewing angle is typically narrow.

Alternatively, the disclosed deciphering technique can be used with a silent speech sensing module, including a coherent light source and sensors, may be integrated into a mobile communication device, such as a smartphone. This integrated sensing module senses silent speech when the user holds the mobile communication device in a suitable location in proximity to the user's face.

In one example, deciphering of silent speech is performed using a machine learning (ML) algorithm, such as a trained artificial neural network (ANN). In this example image processing software converts acquired signals into preprocessed signals, and the trained ANN specifies speech words contained in the preprocessed signals. Different types ANNs may be used, such as a classification NN that eventually outputs words, and a sequence-to-sequence NN which outputs a sentence (word sequence). To train the ANNs, at least several thousands of examples should typically be gathered and augmented, as described above. This "global" training, that relies on a large group of persons (e.g., a cohort of reference human subjects), allows later for a device of a specific user to perform fine adjustments of its deciphering software. In this manner, within minutes or less of wearing the device and turning on the application, the system (e.g., mobile phone and the wearable deice) is ready for deciphering.

In many cases, speech recognition algorithms output some ambiguous results, as described below. In the case of Human-Human real time communication implantation, waiting for the sentence to complete before synthesizing the text to speech to mitigate the ambiguity will result with a significant delay that might not be acceptable. To solve this issue, the disclosed speech synthesizer is configured to quickly generate an ambiguous output for an ambiguous input, so as not to disrupt the natural flow of conversation. The ambiguity itself may still be resolved at a later stage. In some examples, a processor is used for synthesizing speech, by performing the steps of (i) receiving input signals from a human subject that are indicative of intended speech by the human subject, (ii) analyzing the signals to extract words corresponding to the intended speech, such that in at least some time intervals of the intended speech, multiple candidate phonemes are extracted together with respective probabilities that each of the candidate words corresponds to the intended speech in a given time interval, and (iii) synthesizing audible speech responsively to the extracted phonemes, such that in the at least some of the time intervals, the audible speech is synthesized by mixing the multiple candidate phonemes responsively to the respective probabilities.

As described below, to perform step (i) the processor may run an image processing software, and to perform step (ii) the processor may run a neural network. To perform step (iii) the processor may use a voice synthesizer.

The disclosed technique can be used, using the sensed movements of at least one of the target regions of skin on a face of a test subject, measuring the amount of neural activity, to indicate an intent of speech by the test subject even before such speech ever occurred. Finally, in another embodiment, the disclosed technique improves audio quality, for example, of conversations made by mobile telephones in loud public spaces, by cleaning (e.g., removing background signals) from audio.

System Description

Figure 1:
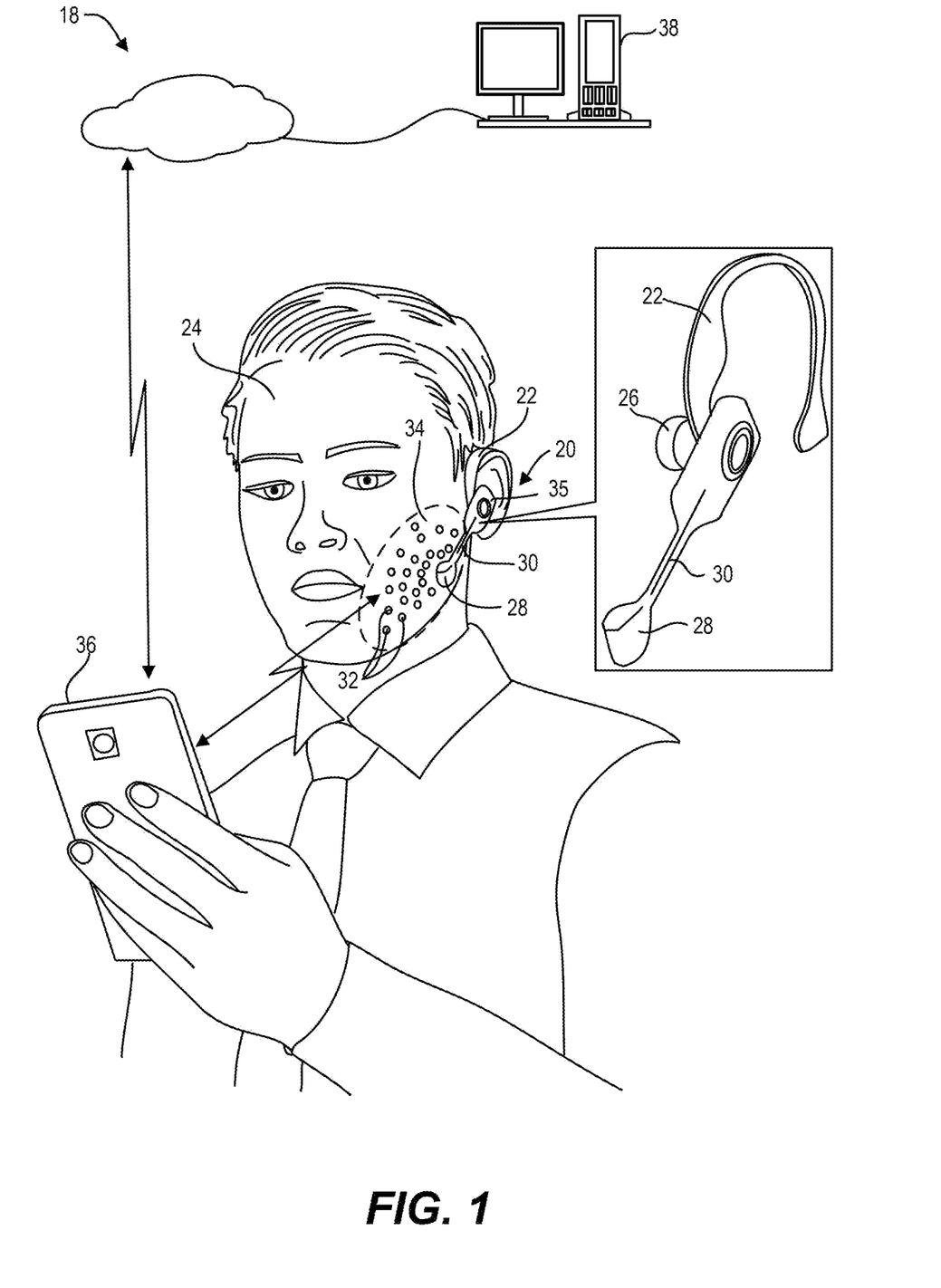
FIG. 1 is a schematic pictorial illustration of a system for silent speech sensing, in accordance with an embodiment of the invention.

FIG. 1 is a schematic pictorial illustration of a system 18 for silent speech sensing, in accordance with an embodiment of the invention. System 18 is based on a sensing device 20, in which a bracket, in the form of an ear clip 22, fits over the ear of a user 24 of the device. An earphone 26 attached to ear clip 22 fits into the user's ear. An optical sensing head 28 is connected by a short arm 30 to ear clip 22 (e.g., an AirPod) and thus is held in a location in proximity to the user's face. In the pictured embodiment, device 20 has the form and appearance of a clip-on headphone, with the optical sensing head in place of (or in addition to) the microphone.

Details of device 20, such as of interface and processing circuitries comprised in device 20, are described in the above-mentioned International Patent Application PCT/IB2022/054527.

Optical sensing head 28 directs one or more beams of coherent light toward different, respective locations on the face of user 24, thus creating an array of spots 32 extending over an area 34 of the face (and specifically over the user's cheek). In the present embodiment, optical sensing head 28 does not contact the user's skin at all, but rather is held at a certain distance from the skin surface. Typically, this distance is at least 5 mm, and it may be even greater, for example at least 1 cm or even 2 cm or more from the skin surface. To enable sensing the motion of different parts of the facial muscles, the area 34 covered by spots 32 and sensed by optical sensing head 28 typically has an extent of at least 1 cm$^2$; and larger areas, for example at least 2 cm$^2$ or even greater than 4 cm$^2$, can be advantageous.

Optical sensing head 28 senses the coherent light that is reflected from spots 32 the face and outputs a signal in response to the detected light. Specifically, optical sensing head 28 senses the secondary coherent light patterns that arise due to reflection of the coherent light from each of spots 32 within its field of view. To cover a sufficiently large area 34, this field of view typically has a wide angular extent, typically with an angular width of at least 60°, or possibly 70° or even 90° or more. Within this field of view, device 20 may sense and process the signals due to the secondary coherent light patterns of all of spots 32 or of only a certain subset of spots 32. For example, device 20 may select a subset of the spots that is found to give the largest amount of useful and reliable information with respect to the relevant movements of the skin surface of user 24.

Within system 18, processing circuitry processes the signal that is output by optical sensing head 28 to generate a speech output. As noted earlier, the processing circuitry is capable of sensing movements of the skin of user 22 and generating the speech output, even without vocalization of the speech or utterance of any other sounds by user 22. The speech output may take the form of a synthesized audio signal or a textual transcription, or both. In that regard, the silent speech detection can be readily implemented as nerve-to-text application, such as, for example, directly transcribing silent speech into an email draft. The synthesized audio signal may be played back via the speaker in earphone 26 (and is useful in giving user 22 feedback with respect to the speech output). Additionally or alternatively, the synthesized audio signal may be transmitted over a network, for example via a communication link with a mobile communication device, such as a smartphone 36. Typically, the synthesis is done at different times than a voiced utterance would happen. This timing can be shorter or longer, and the processer can find the timing difference. Such timing difference may be utilized, as an example, when the synthesized voice is ready earlier than the voiced utterance would happen, to provide a translation of the synthesized voice into another language, with the translated utterance outputted on the time the voiced utterance would.

The functions of the processing circuitry in system 18 may be carried out entirely within device 20, or they may alternatively be distributed between device 20 and an external processor, such as a processor in smartphone 36 running suitable application software. For example, the processing circuitry within device 20 may digitize and encode the signals output by optical sensing head 28 and transmit the encoded signals over the communication link to smartphone 36. This communication link may be wired or wireless, for example using the Bluetooth™ wireless interface provided by the smartphone. The processor in smartphone 36 processes the encoded signal in order to generate the speech output. Smartphone 36 may also access a server 38 over a data network, such as the Internet, in order to upload data and download software updates, for example. Details of the design and operation of the processing circuitry are described hereinbelow with reference to FIG. 3.

In the pictured embodiment, device 20 also comprises a user control 35, for example in the form of a push-button or proximity sensor, which is connected to ear clip 22. User control 35 senses gestures performed by user, such as pressing on user control 35 or otherwise bringing the user's finger or hand into proximity with the user control. In response to the appropriate user gesture, the processing circuitry changes the operational state of device 20. For example, user 24 may switch device 20 from an idle mode to an active mode in this fashion, and thus signal that the device should begin sensing and generating a speech output. This sort of switching is useful in conserving battery power in device 20. Alternatively or additionally, other means may be applied in controlling the operational state of device 20 and reducing unnecessary power consumption, for example as described below with reference to FIG. 5. Moreover, a processor or of device 20 can automatically switch from idle mode to high power consumption mode based on differing trigger types, such as a sensed input (e.g., eye blinks or mouth slightly open, or a pre-set sequence of motions like tongue movement). Also, the user may activate the device, using, for example, a touch button on the device, or from an application in a mobile phone.

In an optional embodiment, a microphone (not shown), may be included, to senses sound uttered by user 24, enabling user 22 to use device 20 as a conventional headphone when desired. Additionally or alternatively, the microphone may be used in conjunction with the silent speech sensing capabilities of device 20. For example, the microphone may be used in a calibration procedure, in which optical sensing head 28 senses movement of the skin while user 22 utters certain phonemes or words. The processing circuitry may then compare the signal output by optical sensing head 28 to the sounds sensed by a microphone (not shown) in order to calibrate the optical sensing head. This calibration may include prompting user 22 to shift the position of optical sensing head 28 in order to align the optical components in the desired position relative to the user's cheek.

Figure 2:
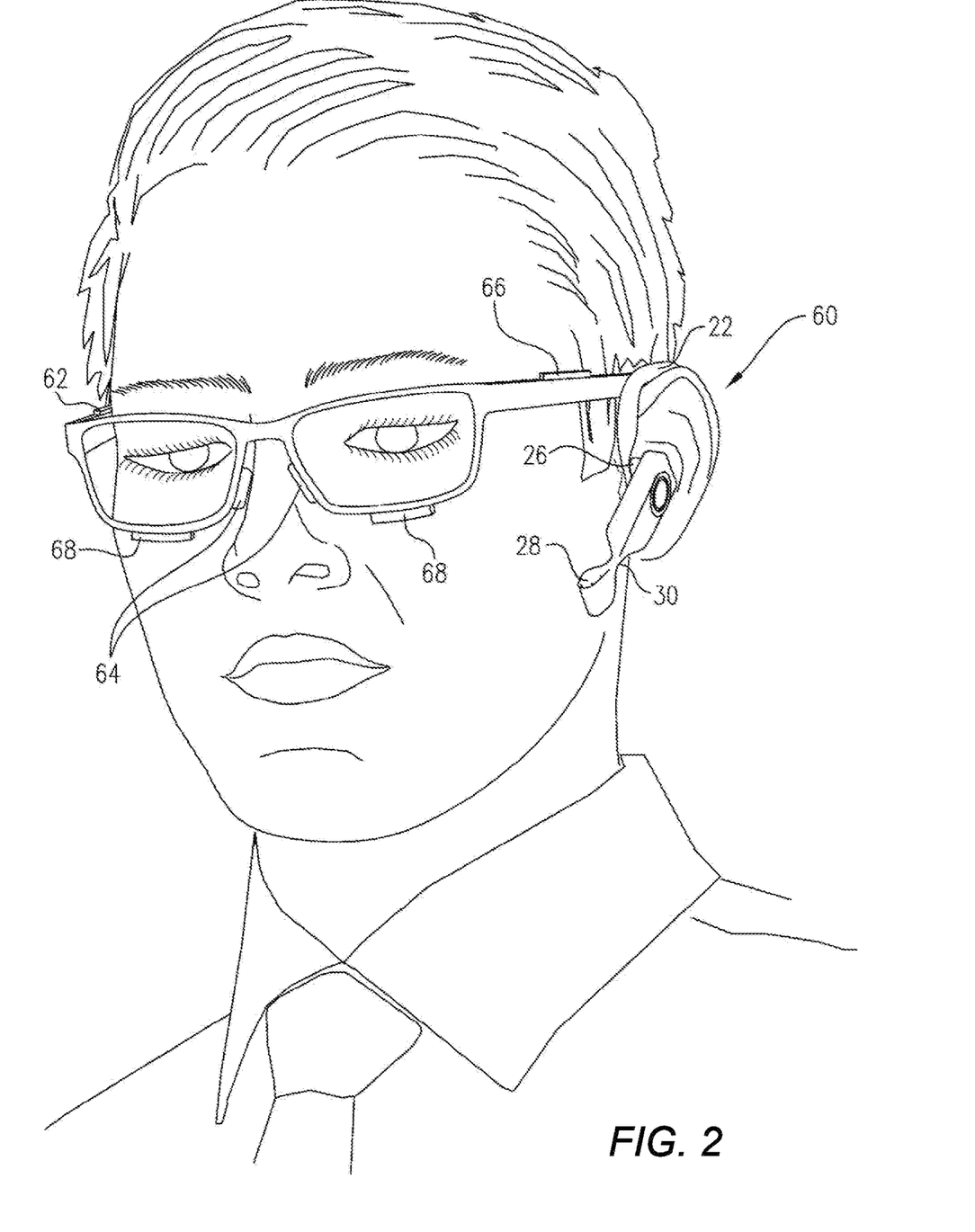
FIG. 2 is a schematic pictorial illustration of a silent speech sensing device, in accordance with another embodiment of the invention.

FIG. 2 is a schematic pictorial illustration of a silent speech sensing device 60, in accordance with another embodiment of the invention. In this embodiment, ear clip 22 is integrated with or otherwise attached to a spectacle frame 62. Nasal electrodes 64 and temporal electrodes 66 are attached to frame 62 and contact the user's skin surface. Electrodes 64 and 66 receive body surface electromyogram (sEMG) signals, which provide additional information regarding the activation of the user's facial muscles. The processing circuitry in device 60 uses the electrical activity sensed by electrodes 64 and 66 together with the output signal from optical sensing head 28 in generating the speech output from device 60.

Additionally or alternatively, device 60 includes one or more additional optical sensing heads 68, similar to optical sensing head 28, for sensing skin movements in other areas of the user's face, such as eye movement. These additional optical sensing heads may be used together with or instead of optical sensing head 28.

Figure 3:
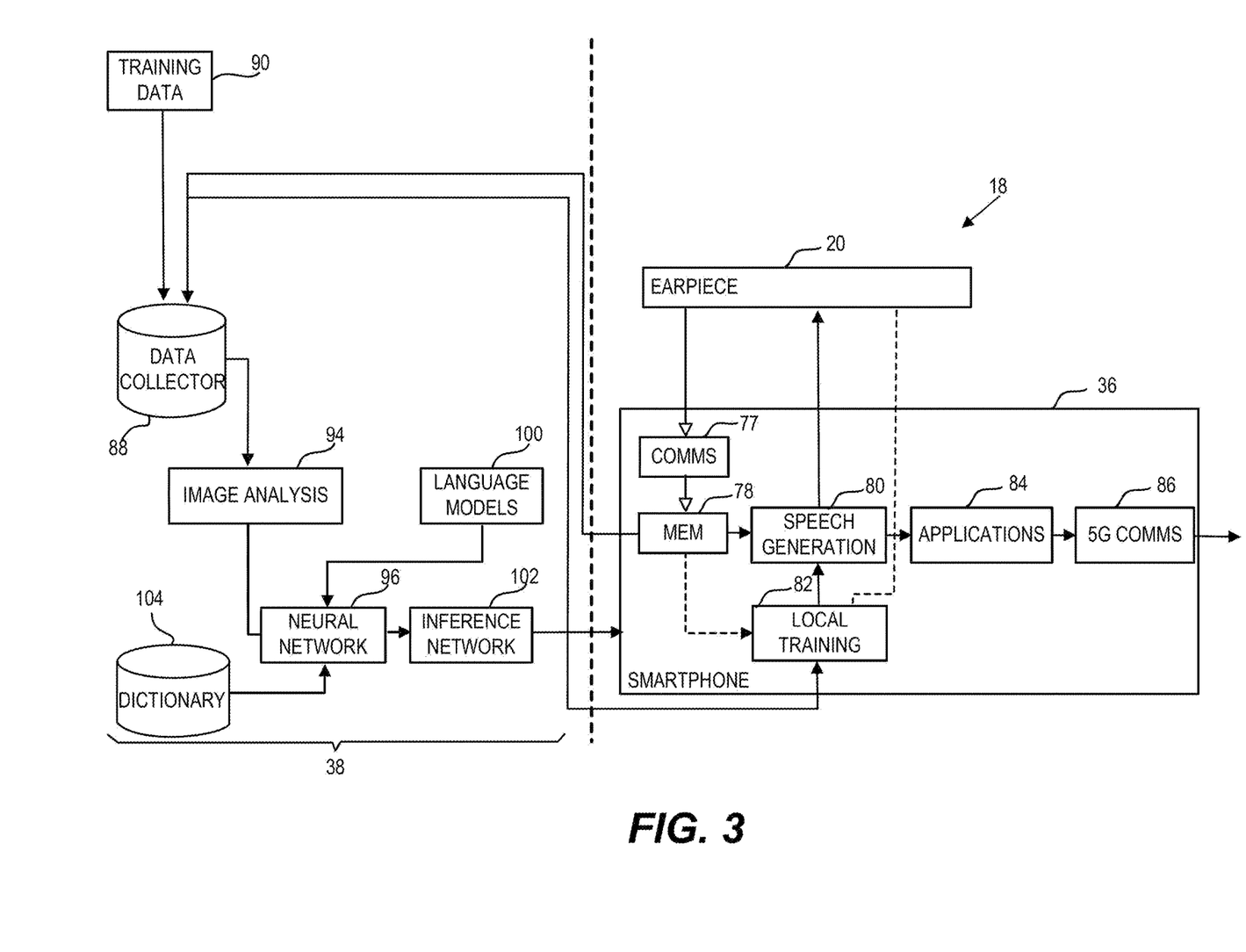
FIG. 3 is a block diagram that schematically illustrates functional components of a system for silent speech sensing, in accordance with an embodiment of the invention.

FIG. 3 is a block diagram that schematically illustrates functional components of system 18 for silent speech sensing, in accordance with an embodiment of the invention. The pictured system is built around the components shown in FIG. 1, including sensing device 20, smartphone 36, and server 38. Alternatively, the functions illustrated in FIG. 3 and described below may be implemented and distributed differently among the components of the system. For example, some or all of the processing capabilities attributed to smartphone 36 may be implemented in sensing device; or the sensing capabilities of device 20 may be implemented in smartphone 36.

Sensing device 20 transmits the encoded signals via a communication interface of the device, such as a Bluetooth interface, to a corresponding communication interface 77 in smartphone 36. In the present embodiment, the encoded output signals from sensing device 20 are received in a memory 78 of smartphone 36 and processed by a speech generation application 80 running on the processor in smartphone 36. Speech generation application 80 converts the features in the output signal to a sequence of words, in the form of text and/or an audio output signal. Communication interface 77 passes the audio output signal back to speaker 26 of sensing device 20 for playback to the user. The text and/or audio output from speech generation application 80 is also input to other applications 84, such as voice and/or text communication applications, as well as a recording application. The communication applications communicate over a cellular or Wi-Fi network, for example, via a data communication interface 86.

The encoding operations of by device 20 and speech generation application 80 are controlled by a local training interface 82. For example, interface 82 may indicate to a processor of device 20 which temporal and spectral features to extract from the signals output by receiver module 48 and may provide speech generation application 80 with coefficients of a neural network, which converts the features to words. In the present example, speech generation application 80 implements an inference network, which finds the sequence of words having the highest probability of corresponding to the encoded signal features received from sensing device 20. Local training interface 82 receives the coefficients of the inference network from server 38, which may also update the coefficients periodically.

To generate local training instructions by training interface 82, server 38 uses a data repository 88 containing coherent light (e.g., speckle) images and corresponding ground truth spoken words from a collection of training data 90. Repository 88 also receives training data collected from sensing devices 20 in the field. For example, the training data may comprise signals collected from sensing devices 20 while users articulate certain sounds and words (possibly including both silent and vocalized speech). This combination of general training data 90 with personal training data received from the user of each sensing device 20 enables server 38 to derive optimal inference network coefficients for each user.

Server 38 applies image analysis tools 94 to extract features from the coherent light images in repository 88. These image features are input as training data to a neural network 96, together with a corresponding dictionary 104 of words and a language model 100, which defines both the phonetic structure and syntactical rules of the specific language used in the training data. Neural network 96 generates optimal coefficients for an inference network 102, which converts an input sequence of feature sets, which have been extracted from a corresponding sequence of coherent light measurements, into corresponding phonemes and ultimately into an output sequence of words. Server 38 downloads the coefficients of inference network 102 to smartphone 36 for used in speech generation application 80.

Method for Speech Sensing

Figure 4:
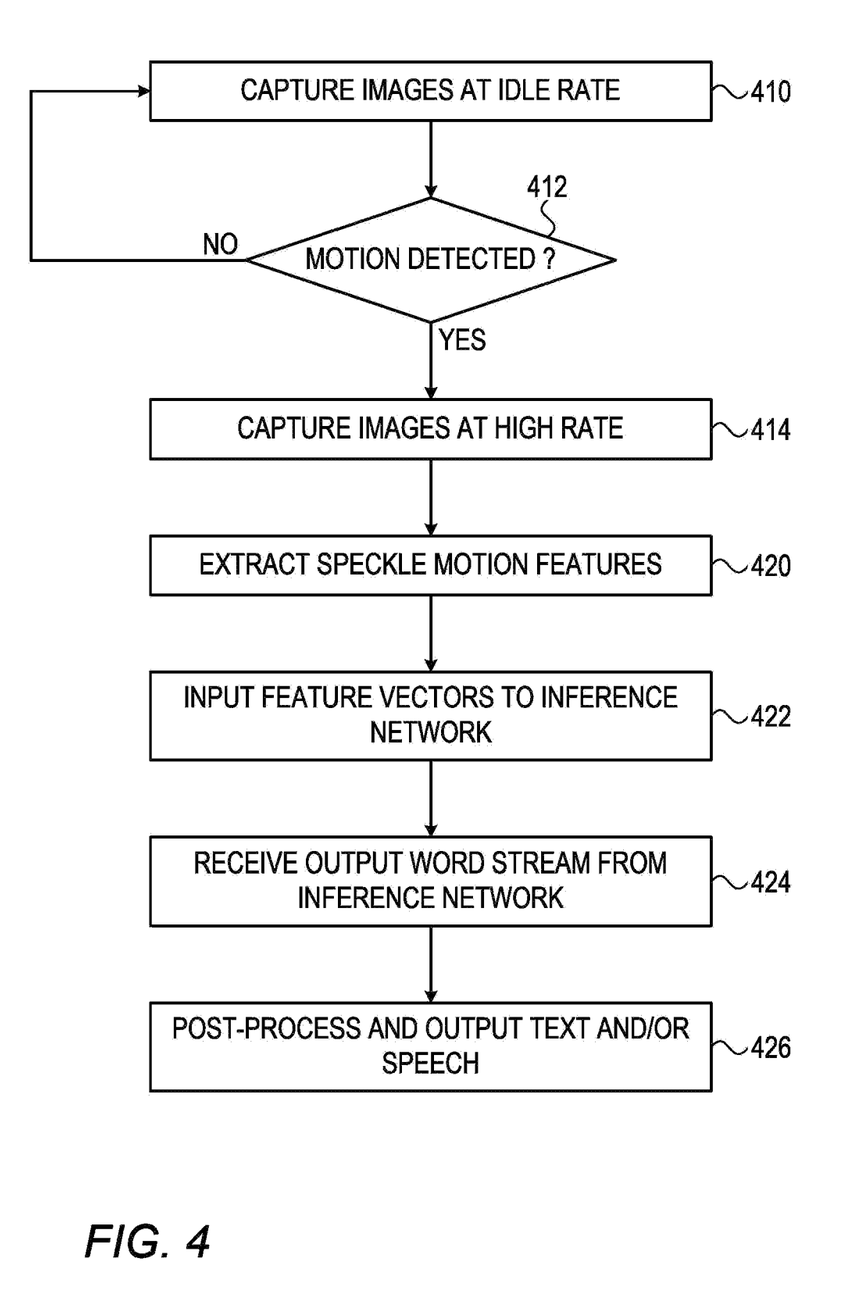
FIG. 4 is a flow chart that schematically illustrates a method for silent speech sensing, in accordance with an embodiment of the invention.

FIG. 4 is a flow chart that schematically illustrates a method for silent speech sensing, in accordance with an embodiment of the invention. This method is described, for the sake of convenience and clarity, with reference to the elements of system 18, as shown in FIGS. 1 and 4 and described above. Alternatively, the principles of this method may be applied in other system configurations, for example using sensing device 60 (FIG. 2) or a sensing device that is integrated in a mobile communication device.

As long as user 24 is not speaking, sensing device 20 operates in a low-power idle mode in order to conserve power of its battery, at an idling step 410. This mode may use a low frame rate, for example twenty frames/sec. While device 20 operates at this low frame rate, it processes the images to detect a movement of the face that is indicative of speech, at a motion detection step 112. When such movement is detected, a processor of device 20 instructs to increase the frame rate, for example to the range of 100-200 frames/sec, to enable detection of changes in the secondary coherent light (e.g., speckle) patterns that occur due to silent speech, at an active capture step 414. Alternatively or additionally, the increase the frame rate may follow instructions received from smartphone 36.

A processor of device 20 then extracts features of optical coherent light pattern motion, at a feature extraction step 420. Additionally or alternatively, the processor may extract other temporal and/or spectral features of the coherent light in the selected subset of spots. Device 20 conveys these features to speech generation application 80 (running on smartphone 36), which inputs vectors of the feature values to the inference network 102 that was downloaded from server 38, at a feature input step 422.

Based on the sequence of feature vectors that is input to the inference network over time, speech generation application 80 outputs a stream of words, which are concatenated together into sentences, at a speech output step 424. As noted earlier, the speech output is used to synthesize an audio signal, for playback via speaker 26. Other applications 84 running on smartphone 36 post-process the speech and/or audio signal to record the corresponding text and/or to transmit speech or text data over a network, at a post-processing step 426.

Deciphering of Detected Silent Speech

As described above, the deciphering of silent speech (i.e., analyzing acquired signals to extract words corresponding to an intended speech) is performed by a chain of software tools, such as image processing software (e.g., tool 94), and an artificial neural network (ANN), such as NN 96. The image processing software converts acquired signals into preprocessed signals, and the ANN specifies intended speech words contained in the preprocessed signals. This section provides examples of deciphering methods and software tools that the disclosed technique may use. It covers training and inference phases by an ANN (FIGS. 5 and 6, respectively), as well as the preprocessing phase (FIG. 7).

Figure 5:
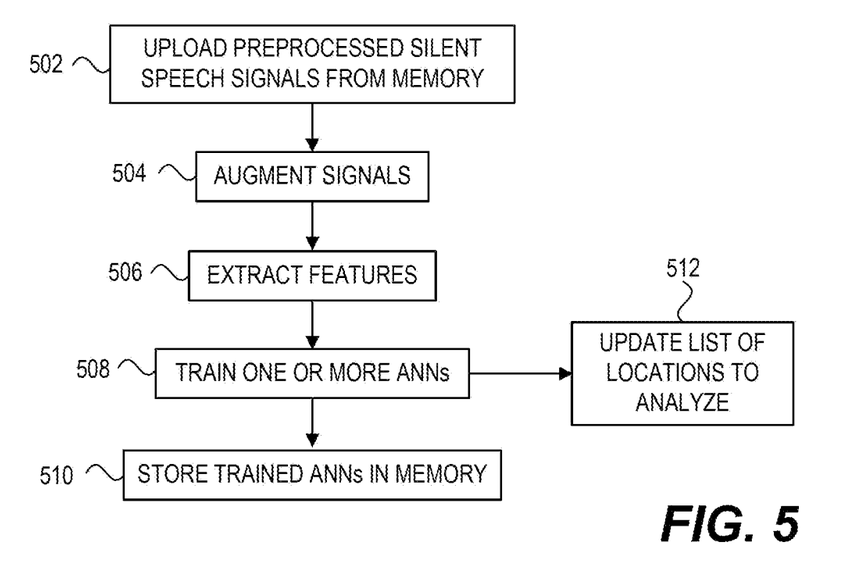
FIG. 5 is a flow chart that schematically illustrates a method for training an Artificial Neural Network (ANN) to perform silent speech deciphering, in accordance with an embodiment of the invention.

FIG. 5 is a flow chart that schematically illustrates a method for training an ANN to perform silent speech deciphering, in accordance with an embodiment of the invention. This method can be used to train, for example, two different ANN types: a classification neural network that eventually outputs words, and a sequence-to-sequence neural network which outputs a sentence (word sequence). The process begins in data uploading step 502, with uploading from a memory of server 38 pre-processed training data, such as outputted by image analyses tool 94, that was gathered from multiple reference human subjects, e.g., during a development.

The silent speech data is collected from a wide variety of people (people of varying ages, genders, ethnicities, physical disabilities, etc.). The number of examples required for learning and generalization is task dependent. For word/utterance prediction (within a closed group) at least several thousands of examples were gathered. For the task of word/phoneme sequence prediction, the dataset size is measured in hours, and several thousands of hours were gathered for transcription.

In data augmentation step 504, a processor augments the image processed training data to get more artificial data for the training process. In particular. the input here is an image processed secondary coherent light pattern, with some of the image processing steps described below. Step 504 of data augmentation may include the sub-steps of (i) Time dropout, where amplitudes at random time points are replaced by zeros, (ii) Frequency dropout—the signal is transformed into the frequency domain. Random frequency chunks are filtered out. (iii) Clipping, where the maximum amplitude of the signal at random time points is clamped. This adds a saturation effect to the data, (iv) Noise addition, where gaussian noise is added to the signal, and speed change, where the signal is resampled to achieve a slightly lower or slightly faster signal.

At features extraction step 506, the augmented dataset goes through the feature extraction module. In this step the processor computes time domain silent speech features. For this purpose, for example, each signal is split into low and high frequency components, $x_{low}$ and $x_{high}$, and windowed to create time frames, using a frame length of 27 ms and shift of 10 ms. For each frame we compute five time-domain features and nine frequency domain features, a total of 14 features per signal. The time-domain features are as follows:

$$\left[\frac{1}{n}\sum_i (x_{low}[i])^2, \frac{1}{n}\sum_i x_{low}[i], \frac{1}{n}\sum_i (x_{high}[i])^2, \frac{1}{n}\sum_i |x_{high}[i]|, ZCR(x_{high})\right]$$

where ZCR is the zero-crossing rate. In addition, we use magnitude values from a 16-point short Fourier transform, i.e., frequency domain features. All features are normalized to zero mean unit variance.

For ANN training step 508, the processor split the data into training, validation and test sets. The training set is the data used to train the model. Hyperparameter tuning is done using the validation set, and final evaluation is done using the test set.

The model architecture is task dependent. Two different examples describe training two networks for two conceptually different tasks. First is the signal transcription, i.e., translating silent speech to text by word/phoneme/letter generation. This task is addressed by using a sequence-to-sequence model. The second task is word/utterance prediction, i.e., categorizing utterances uttered by users into a single category within a closed group. It is addressed by using a classification model.

The disclosed sequence-to-sequence model is composed of an encoder, which transforms the input signal into high level representations (embeddings), and a decoder, which produces linguistic outputs (i.e., characters or words) from the encoded representations. The input entering the encoder is a sequence of feature vectors, as described in the "feature extraction" module. It enters the first layer of the encoder—a temporal convolution layer, which down samples the data to achieve a good performance. The model may use an order of hundred such convolution layers.

Outputs from the temporal convolution layer at each time step are passed to three layers of bidirectional recurrent neural networks (RNN). The processor employs long short-term memory (LTSM) as units in each RNN layer. Each RNN state is a concatenation of the state of the forward RNN with the state of the backward RNN. The decoder RNN is initialized with the final state of the encoder RNN (concatenation of the final state of the forward encoder RNN with the first state of the backward encoder RNN). At each time step, it gets as input the preceding word, encoded one-hot and embedded in a 150-dimensional space with a fully connected layer. Its output is projected through a matrix into the space of words or phonemes (depending on the training data).

The sequence-to-sequence model conditions the next step prediction on the previous prediction. During learning, a log probability is maximized:

$$\max_\theta \sum_i \log P(y_i | x, y^*_{<i}; \theta)$$

where y<i is the ground truth of the previous prediction. The classification neural network is composed of the encoder as in the sequence-to-sequence network and an additional fully connected classification layer on top of the encoder output. The output is projected into the space of closed words and the scores are translated into probabilities for each word in the dictionary.

The results of the above entire procedure are two types of trained ANNs, expressed in computed coefficients for an inference network 102. The coefficients are stored (step 510) in a memory of server 38.

In day-to-day use, training interface 82 receives up to date coefficients of inference network 102 from server 38, where server 38 may also update the coefficients periodically. the coefficients of inference network 102 are stored in a memory of earpiece device 20 or in memory 78 of smartphone 36. First ANN task is the signal transcription, i.e., translating silent speech to text by word/phoneme/letter generation. The second ANN task is word/utterance prediction, i.e., categorizing utterances uttered by users into a single category within closed group. These networks are plugged in the system to work as part of it at the below described in FIG. 6.

Finally, the training session is used for optimizing a selection and priority of locations of secondary coherent light on the face of user 24 to analyze. In selection updating step 512, the processor updates a list and order of use of such locations.

Figure 6:
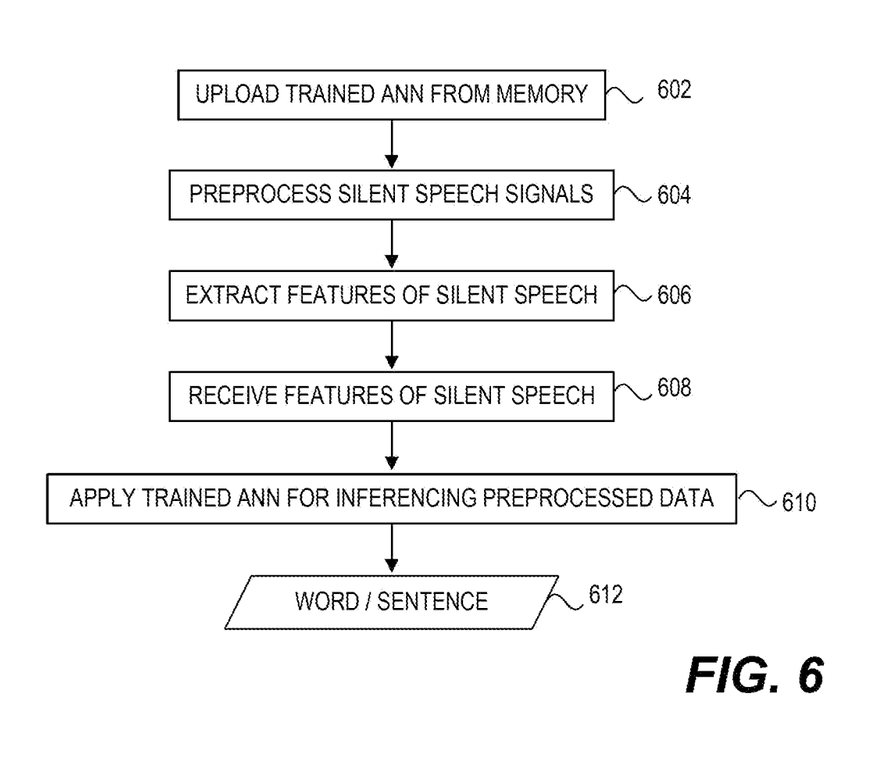
FIG. 6 is a flow chart that schematically illustrates a method of using a trained ANN in inference to perform silent speech deciphering, in accordance with an embodiment of the invention.
Figure 7:
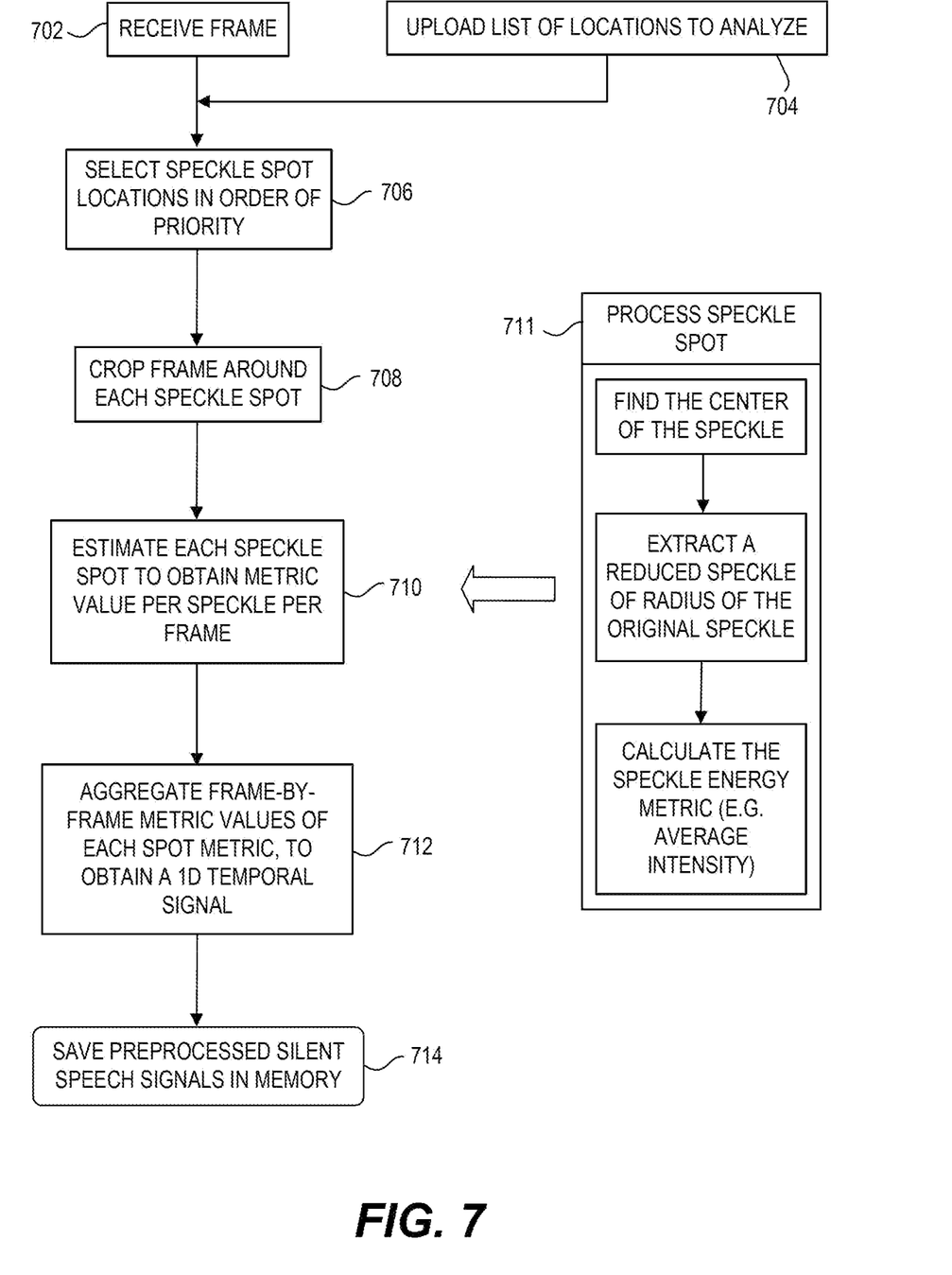
FIG. 7 is a flow chart that schematically illustrates a method of preprocessing silent speech sensed data in preparation for speech deciphering, in accordance with an embodiment of the invention.

FIG. 6 is a flow chart that schematically illustrates a method of using a trained ANN in inference to perform silent speech deciphering, in accordance with an embodiment of the invention. Such trained ANN may be inference network 102. The process begins with, for example, the processor in smartphone 36 running suitable application software that uploads inference network 102, at trained ANN uploading step 602.

At a silent speech preprocessing step 604, a processor of sensing device 20 receives silent speech signals and preprocess this using, for example, an image processing software included in device 20.

At silent speech feature extraction step 606, the processor of sensing device 20 extracts from the preprocessed silent speech signals silent speech features, as described in FIG. 7.

At silent speech features receiving step 608, smartphone 36 receives encoded signals via a communication interface 77. In the present embodiment, the encoded signals of step 606 from sensing device 20 are received in a memory 78 of smartphone 36.

At a silent speech inference step 610, the extracted features are processed by a speech generation application 80 running on the processor in smartphone 36. Speech generation application 80 runs inference network 102 to converts the features in the output signal to a sequence (612) of words. These words may be subsequently outputted in a form of text and/or an audio output signal (e.g., using voice synthesizer).

FIG. 7 is a flow chart that schematically illustrates a method of preprocessing silent speech sensed data in preparation for speech deciphering, in accordance with an embodiment of the invention. The process begins by a processor of device 20 receiving a frame from a camera of device 20 that captured at secondary coherent light reflections from the cheek skin area at high frame rate (e.g., 500 fps), at a frame receiving step 702.

For each frame the raw image is transferred to an image processing algorithm that extracts the skin motion at a set of pre-selected locations on the user's face. The number of locations to inspect is an input to the algorithm. The locations on the skin that are extracted for coherent light processing are taken from a predetermined list that a processor uploads (704) from memory. The list specifies anatomical locations, for example: cheek above mouth, chin, mid-jaw, cheek below mouth, high cheek and back of cheek. Furthermore, the list is dynamically updated with more points on the face that are extracted during the training phase (in step 512 of FIG. 2). The entire set of locations is ordered in descending order such that any subset of the list (in order)

minimizes the word error rate (WER) with respect to the chosen number of locations that are inspected.

At a coherent light spot selection step 706, the processor selects the locations to analyze according to the list provided in step 704.

At a cropping step 708, the processor crops each of the coherent light spots that were extracted in the frame around the coherent light spots, and the algorithm process the spot. Typically, the process of coherent light spot processing involves reducing by two order of magnitude a size of full frame image pixels (of ~1.5 MP) that is taken with the camera, with a very short exposure. Exposure is dynamically set and adapted to be able to capture only coherent light reflections and not skin segments. For day light and green laser this is found to be around $1/4000$ seconds. As the image is mostly empty (e.g., of cheek skin—being black regions) and includes the laser point that forms a secondary coherent light pattern. In the preprocessing phase, the laser point (e.g., speckle) region is identified, and the image is cropped, so that the algorithms run only on this region. For example, the processor reduces the full image (1.5 MP) to a 18 KP image, which immediately accelerates processing time for the remainder of the algorithm.

The image processing algorithm may be executed on a CPU, GPU, or hardware logic that is embedded within or adjacent to the camera sensor chip—to be able to eliminate the flow of high bandwidth data in the system. This may reduce the total power consumption of the device. Moreover, the preprocessed data corresponds to the physical vibrations and movements of the user's facial skin (in each location), thus is at much lower bandwidth compared to the raw images—few hundred of samples per second for each location.

Once the image processor has identified the region of interest within the coherent light spot, it improves the image contrast, by removing noise using a threshold s to determine black pixels and then computes (710) a characteristic metric of the coherent light, such as scalar speckle energy measure, e.g., an average intensity. Step 710 includes steps described in box 711, which includes, after identifying the coherent light pattern at step 706 and cropping it at step 708, further reducing the image to a predefined fraction (e.g., $1/3$) of the radius of the coherent light spot (which amounts to reducing the aforementioned 18 KP image to only 2 KP, upon which the metric is calculated, e.g., as average intensity of the 2 KP pixels.

Analyzing changes in time in the measure (e.g., in average speckle intensity) by the processor is one example of detection of changes in the secondary coherent light patterns. Alternatively, other metrics may be used such as the detection of specific coherent light patterns. Finally, a sequence of values of this scalar energy metric is calculated frame-by-frame and aggregated (712), giving a 1D temporal signal.

The 1D temporal signals are the preprocessed signals that area stored for use in silent speech deciphering, as described above in FIGS. 5 and 6.

The accuracy of the word detection process described above is optimized using a combination of the following concepts:

1) Personalized Algorithm Parameters.

During normal speech of the user, the system simultaneously samples the user's voice and the facial movements. Automatic speech recognition (ASR) and Natural Language Processing (NLP) algorithms are applied on the actual voice, and the outcome of these algorithms is used for optimizing the parameters of the motion to language algorithms. These parameters include the weights of the various neural networks, as well as the spatial distribution of laser beams for optimal performance. For subjects with speech disorders who have intact nervous systems and muscle fibers, transfer learning techniques can be used in applying results acquired from subjects who are capable of speech.

2) Limiting the Word Set.

Limiting the output of the algorithms to a pre-defined word set significantly increases the accuracy of word detection in cases of ambiguity—where 2 different words result in similar movements on the skin.

The used word set can be personalized over time, adjusting the dictionary to the actual words used by the specific user, with their respective frequency and context.

3) Context Optimized Word Set.

Including the context of the conversation in the input of the words and sentences extraction algorithms increases the accuracy by eliminating out-of-context options. The context of the conversation is understood by applying Automatic speech recognition (ASR) and Natural Language Processing (NLP) algorithms on the other side's voice.

Voice Synthesis

The information that is extracted from the inner/silent speech can be used in various ways, e.g., 1) human—machine communication (e.g., personal assistant/"Alexa" type devices) 2) human—human communication (e.g., phone calls).

For human-human communication the system generates a synthetic voice of the user based on the inner speech and transmits this synthetic voice to the other side's device. Alternatively, human-human communication can be made via 3rd party applications such as instant messaging apps, in which case, the inner speech is converted into text and transmitted to the other side's device.

In many cases, speech recognition algorithms result with some ambiguous result. For example:

The user says the word "Justice", the classification algorithm predicts that with 50% certainty the articulated word was "justice", 30% "practice" and 20% "lattice". In other implementations of NLP algorithms, the algorithm selects the right word based on the context of the whole sentence that in many cases is revealed only after the ambiguous word has been said.

In the case of Human-Human real time communication implantation, waiting for the sentence to complete before synthesizing the text to speech will result with a significant delay that might not be acceptable.

To solve this issue, the speech synthesizer is configured to generate an ambiguous output for an ambiguous input. Examples of ambiguous input are confusing words/phonemes. For example, the system may not fully determine whether the user said "down" or "town". The unit of work in this case is therefore the sound (called "phoneme") and not an entire word. In response, the system generates and transmits speech that is a mixture of the two candidate phonemes. In the above example, if the system is not certain whether the user said "down" or "town" then the resulting sound will be a mixture of "t" and "d" at the appropriate times.

To further illustrate the concept, for the above example constituting of the words "justice", "practice" and "lattice," the synthesizer will not send a clear "justice" word, although it is the option with the highest probability, but instead, the algorithm will create a sound that is a combination of articulated words weighted as being probably 50% "justice", 30% "practice" and 20% "lattice"—same probabilities as the input. This implementation will transfer the ambiguity to the other person's brain—to be resolved at a later time, after the sentence is complete.

Figure 8:
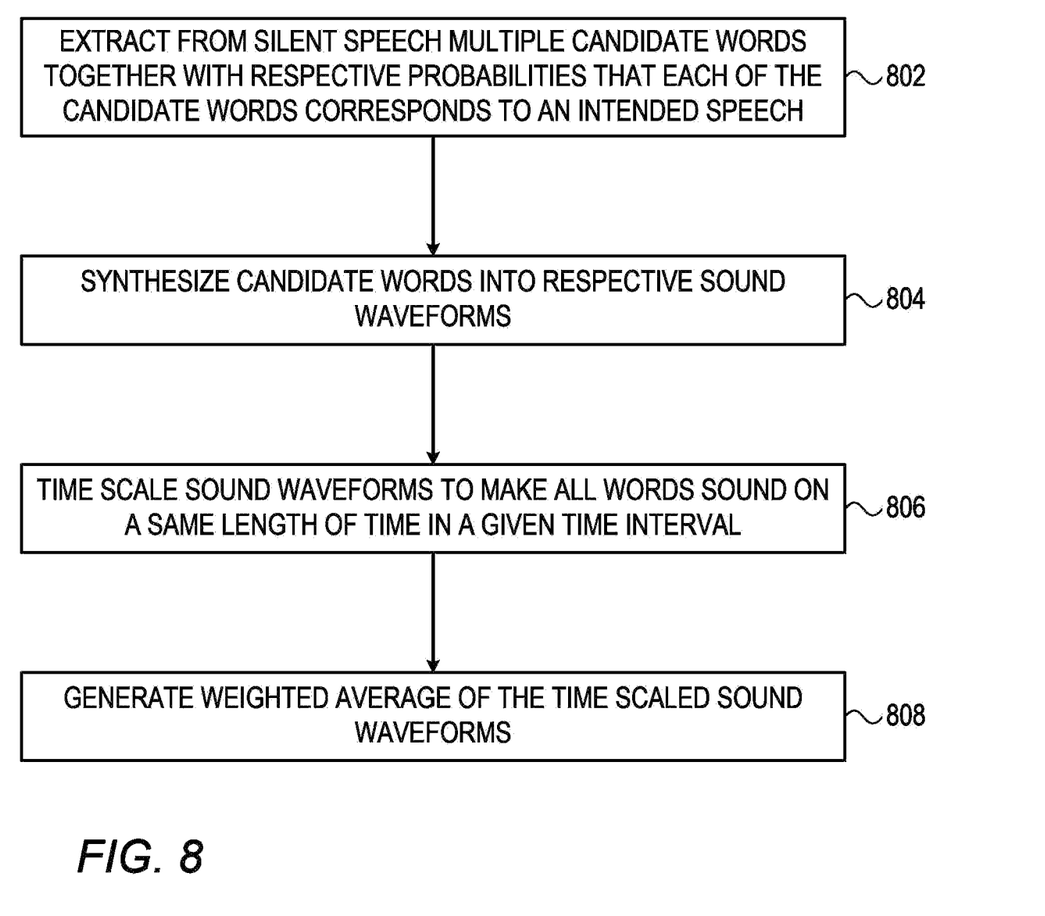
FIG. 8 is a flow chart that schematically illustrates a method of generating an ambiguous speech output for an ambiguous silent speech input, in accordance with an embodiment of the invention.

The algorithm for generating ambiguous words comprises two steps:
 a) Time scaling to make all words the same length of time
 b) Weighted average of the sound waveform FIG. 8 is a flow chart that schematically illustrates a method of generating an ambiguous speech output for an ambiguous silent speech input, in accordance with an embodiment of the invention. The process begins at words generation step 802, with multiple candidate words are extracted by speech generation application 80 together with respective probabilities that each of the candidate words corresponds to the intended speech in a given time interval.

Next, at words synthesizing step 804, a processor synthesizes the extracted words into audio signals (e.g., 1D sound waveforms). At a time-scaling step 806, the processor, such as a one of a voice synthesizer (e.g., one example of application 84), time scales similar words to make all words sound over a same time duration within a given time interval. Finally, at sound mixing step 808, the audible speech is synthesized into an ambiguous audio output by mixing the multiple words responsively to the respective probabilities (e.g., by the processor performing weighted summation of the sound waveform amplitudes with the probabilities that serve as respective weights).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A wearable coherent light sensing system, comprising:
 at least one wearable coherent light source configured to direct light towards a portion of a cheek of a user;
 at least one wearable sensor configured to receive light source reflections from the portion of the cheek and to output associated reflection signals;
 at least one processor operable in an idle mode and in a high power mode;
  wherein in the idle mode, the at least one processor is configured to receive the reflection signals from the at least one sensor, process the reflection signals to identify from reflection signals associated at least one movement in the portion of the cheek at least one trigger, and
 automatically switch to the high power mode upon identification of the at least one trigger;
  wherein in the high power mode, the at least one processor is configured to analyze the reflection signals from the portion of the cheek to identify facial movements associated with silent speech; and
  wherein following the identification of the facial movements associated with the silent speech, the at least one processor is configured to decipher the facial movements in the portion of the cheek and generate an output associated with the silent speech.

2. The wearable coherent light sensing system of claim 1, wherein the facial movements associated with silent speech include minute movements manifest in cheek skin of the portion of the cheek, and wherein the at least one processor is configured to generate the output associated with the silent speech by deciphering the movements manifest in the cheek skin.

3. The wearable coherent light sensing system of claim 1, wherein the facial movements associated with silent speech include minute facial movements and wherein the at least one processor is configured to generate the output associated with the silent speech by deciphering the minute facial movements using speckle analysis.

4. The wearable coherent light sensing system of claim 1, wherein the output includes non-vocalized words.

5. The wearable coherent light sensing system of claim 1, wherein the output includes audio.

6. The wearable coherent light sensing system of claim 1, wherein the output includes words subsequently vocalized following the silent speech.

7. The wearable coherent light sensing system of claim 1, wherein a frame rate in the idle mode is lower than a frame rate in the high power mode.

8. The wearable coherent light sensing system of claim 7, wherein the frame rate of the high power mode is between 100 to 200 frames per second.

9. The wearable coherent light sensing system of claim 1, wherein while operating in the idle mode, the at least one processor is further configured to receive user input from a controller and to switch to the high power mode based on the received user input.

10. The wearable coherent light sensing system of claim 9, wherein the controller includes a proximity sensor.

11. The wearable coherent light sensing system of claim 9, wherein the controller includes a push button.

12. The wearable coherent light sensing system of claim 1, wherein the at least one processor is further configured to determine a sequence of words from the identified deciphered facial movements.

13. The wearable coherent light sensing system of claim 12, wherein determining the sequence of words involves using a neural network associated with personal training data.

14. The wearable coherent light sensing system of claim 1, wherein the coherent light source and the at least one sensor are configured to be supported by an ear of the user.

15. The wearable coherent light sensing system of claim 14, wherein the at least one coherent light source is configured, when supported by the ear, to illuminate the portion of the cheek of the user.

16. The wearable sensing system of claim 14, wherein the at least one coherent light source is configured to direct a plurality of beams of coherent light toward different locations on the portion of the cheek resulting in an array of spots of at least 1 $cm^{2.}$ 17. The wearable sensing system of claim 16, wherein the at least one sensor is configured to assume, when supported by the ear, a distance of at least 5 mm from the portion of the cheek a skin surface.

18. A method for deciphering silent speech, the method comprising:
 directing coherent light toward a portion of a cheek of a user;
 receiving from at least one sensor, reflections of the coherent light from the portion of the cheek;
 in an idle power mode, processing signals associated with the reflections to identify from reflection signals associated at least one movement in the portion of the cheek at least one trigger;

automatically switching to a high power mode upon identification of the at least one trigger, wherein in the high power mode a frame rate is higher than in the idle mode;

in the high power mode, analyzing the reflection signals from the portion of the cheek at the higher frame rate to identify facial movements associated with silent speech; and deciphering the facial movements in the portion of the cheek to generate an output associated with the silent speech.

19. The method of claim 18, wherein the reflections result from minute facial movements in cheek skin, and wherein deciphering includes extracting meaning from the movements in the cheek skin.

20. The method of claim 18, wherein the reflections result from minute facial movements, and wherein deciphering includes using speckle analysis to extract meaning from the facial movements.

21. The method of claim 18, wherein the at least one trigger is indicative of an intent of speech by the user even before such speech ever occurred.

* * * * *